United States Patent
Bickerstaff

(10) Patent No.: US 8,953,018 B2
(45) Date of Patent: Feb. 10, 2015

(54) GENERATION AND DISPLAY OF STEREOSCOPIC IMAGES

(71) Applicant: Sony Computer Entertainment Europe Limited, London (GB)

(72) Inventor: Ian Henry Bickerstaff, London (GB)

(73) Assignee: Sony Computer Entertainment Europe Limited (GB)

( * ) Notice: Subject to any disclaimer, the term of this patent is extended or adjusted under 35 U.S.C. 154(b) by 324 days.

(21) Appl. No.: 13/622,103

(22) Filed: Sep. 18, 2012

(65) Prior Publication Data

US 2013/0070064 A1    Mar. 21, 2013

(30) Foreign Application Priority Data

Sep. 19, 2011    (GB) .................................. 1116155.1

(51) Int. Cl.
*H04N 13/00*    (2006.01)
*H04N 13/04*    (2006.01)

(52) U.S. Cl.
CPC ....... *H04N 13/0018* (2013.01); *H04N 13/0438* (2013.01)
USPC .......................................................... 348/43

(58) Field of Classification Search
CPC ................................. H04N 13/0029
USPC ......................................................... 348/43
IPC ..................................... H04N 13/00
See application file for complete search history.

(56) References Cited

U.S. PATENT DOCUMENTS

| | | |
|---|---|---|
| 2003/0048416 A1 | 3/2003 | Meltzer |
| 2005/0094869 A1 | 5/2005 | Yoda et al. |

(Continued)

FOREIGN PATENT DOCUMENTS

| | | |
|---|---|---|
| EP | 2106136 A1 | 9/2009 |
| EP | 2151996 A3 | 7/2010 |
| WO | 2011096252 A1 | 8/2011 |

OTHER PUBLICATIONS

British Examination Search Report for Application No. GB1116155.1 dated Jan. 12, 2012.

(Continued)

*Primary Examiner* — Jay Patel
*Assistant Examiner* — Yulin Sun
(74) *Attorney, Agent, or Firm* — Lerner, David, Littenberg, Krumholz & Mentlik, LLP

(57) ABSTRACT

A method of displaying successive stereoscopic image pairs comprises: capturing, at a predetermined image rate, a sequence of images suitable for a left eye of a viewer and capturing, at the predetermined image rate, a corresponding sequence of images suitable for a right eye of the viewer; and displaying a sequence of stereoscopic image pairs at the predetermined image rate, in which each displayed stereoscopic image pair comprises one left image suitable for the left eye of the viewer and one right image suitable for the right eye of the viewer, the one left and one right images being derived from the captured sequence of images suitable for the left and right eye of the viewer, respectively; in which: the one left image and the one right image of each stereoscopic image pair are displayed for different respective portions of an image period defined by the predetermined image rate; and the effective temporal position of the one left image of a stereoscopic image pair for display is different to the effective temporal position of the one right image of that stereoscopic image pair.

10 Claims, 12 Drawing Sheets

(56) References Cited

U.S. PATENT DOCUMENTS

| | | |
|---|---|---|
| 2010/0295927 A1 | 11/2010 | Turner et al. |
| 2011/0063423 A1 | 3/2011 | Yamada et al. |
| 2011/0199457 A1 | 8/2011 | Yoshida et al. |
| 2011/0285815 A1 * | 11/2011 | Kervec et al. .................. 348/43 |

OTHER PUBLICATIONS

British Search Report for Application No. GB1116155.1 dated Jan. 11, 2012.

* cited by examiner

GENERATION AND DISPLAY OF STEREOSCOPIC IMAGES

CROSS REFERENCE TO RELATED APPLICATION

The present application claims the benefit of and priority to GB application number 1116155.1, filed in the United Kingdom Intellectual Property Office on 19 Sep. 2011, the entire disclosure of which is incorporated herein by reference.

BACKGROUND

1. Field of the Invention

This invention relates to the generation and display of stereoscopic images.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or implicitly admitted as prior art against the present invention.

Three dimensional (3D) or stereoscopic television has recently been made available to the consumer, and it is expected that the amount of 3D equipment and programming will increase rapidly in the next few years.

3D television relies on a stereoscopic technique whereby pairs of images are captured by respective cameras which are laterally displaced (that is, substantially in a horizontal image direction) by a certain distance, for example a typical spacing of a user's eyes. The pairs of images therefore represent slightly different views of the same scene; in general they will encompass the same items within the scene (except perhaps at the image extremities) but the relative positions of the items between the two images will depend on the distance of the items from the camera arrangement.

When the images are displayed, it is important that each of the user's eyes sees (at least mainly) a respective one of the image pair. In practice this is achieved in various ways, such as by the user wearing polarising, time multiplexing or colour-filtering spectacles, or by the television screen itself being provided with a special lens arrangement which diverts each of the two images to a respective eye position of the viewer. Of these, the colour-filtering technique, common in early attempts at 3D cinema, is not generally used in 3D television technology.

The time-multiplexing approach has been adopted by several leading 3D television manufacturers. It works by the television displaying rapidly alternating left and right images whilst each lens in the time-multiplexing glasses worn by the viewer blocks or passes light from the display when required. So, each lens of the glasses alternate between blocking and passing light in synchronism with the display of the image appropriate to that eye of the user. This results in the left eye of the user seeing only the left images and the right eye of the user seeing only the right images. Each 3D image pair is thus comprised of a pair of images, with each image from this pair displayed half an image period apart to a different eye. A display which works in this way is known as a sequential stereoscopic display.

One drawback of the sequential display system comes from the fact that each image from the stereoscopic image pair is conventionally captured at the same point in time. On the television, however, these images are displayed half an image period apart, to allow for the sequential nature of the glasses arrangement. The images for one eye are thus seen half an image period later than the images for the other eye. For images of fast moving objects, for example as part of sports coverage or video game play, the way in which the eyes and brain process this time disparity causes the user to incorrectly register depth for horizontally fast-moving objects and to incorrectly register misalignment for vertically fast-moving objects. This phenomenon is known as the "Pulfrich effect".

As an example, consider a scenario where the images are of a fast-moving football, and where the right image of each 3D image pair is displayed with a half image period's delay with respect to the left image of that image pair. If the football is moving from the left to the right at a particular constant depth with respect to a background image, then the viewer will incorrectly perceive the football as being at a greater depth (in an arbitrary set of coordinates in which "greater depth" implies that an object is perceived to be closer to the viewer) than the intended particular constant depth. Conversely, if the football is moving from the right to the left at a particular constant depth, then the viewer will incorrectly perceive the football as being at a lesser depth (that is, appearing further away) than the intended particular constant depth. Also, if the football is moving vertically, the left and right images of the football will appear misaligned, providing the viewer with an image that is uncomfortable to look at.

The same phenomenon will occur if the left image is delayed with respect to the right image, except that, in this case, the football will (incorrectly) appear to be further away from the viewer as it moves from the left to the right and closer to the viewer as it moves from the right to the left.

This presents a problem in displaying fast-moving 3D images on a sequential stereoscopic display, in particular 3D sports coverage or video games, where accurately judging the depth of fast moving objects is very important.

SUMMARY

This invention provides a method of displaying successive stereoscopic image pairs, the method comprising:

capturing, at a predetermined image rate, a sequence of images suitable for a left eye of a viewer and capturing, at the predetermined image rate, a corresponding sequence of images suitable for a right eye of the viewer;

displaying a sequence of stereoscopic image pairs at the predetermined image rate, in which each displayed stereoscopic image pair comprises one left image suitable for the left eye of the viewer and one right image suitable for the right eye of the viewer, the one left and one right images being derived from the captured sequence of images suitable for the left and right eye of the viewer, respectively; in which:

the one left image and the one right image of each stereoscopic image pair are displayed for different respective portions of an image period defined by the predetermined image rate; and the effective temporal position of the one left image of a stereoscopic image pair for display is different to the effective temporal position of the one right image of that stereoscopic image pair.

Embodiments of the present invention recognise that the problems of depth perception and image misalignment caused by the left and right images from a stereoscopic image pair being captured at the same time but displayed half an image period out of synchronisation may be alleviated by ensuring that the effective temporal position of the left and right images is also correspondingly half an image period out of synchronisation. By doing this, the brain no longer registers a delay between the left and right images (the cause of the Pulfrich effect defined above), since the spatial position of the fast-moving object appears to have changed by the correct amount anticipated by the brain during the delay. The problems of depth perception and image misalignment are thus reduced.

In one embodiment of the invention, the effective temporal positions of the left and right images from a stereoscopic image pair are made half an image period out of synchronisation by synchronising the left and right image cameras to capture the respective image sequences half an image period out of synchronisation.

In an alternative embodiment of the invention, the left and right image sequences are captured at the same instants (that is to say, a left/right image pair is captured at one capturing instant, then a next left/right image pair is captured at a next capturing instant, and so on), but then at least one of the sequences is processed so as to create interpolated images. The interpolated images are generated such that their temporal position is different to that of the capturing instants. The interpolated images then constitute at least one of the sequences of output left and right images. The overall arrangement is such that the effective temporal positions of the output left and right images constituting a stereoscopic image pair are half an image period out of synchronisation. This method enables the problems described above to be alleviated in respect of left and right images that have been captured at the same instant (which corresponds to a commonly-used convention for 3D image capture). It also easily allows 3D slow motion and freeze frame effects to be implemented, which would be more difficult to achieve in the case where left and right images are captured out of synchronisation with each other.

In embodiments of the invention, both left and right sequences are interpolated so as to avoid any interpolation artefacts being visible in one but not the other sequence.

Further respective aspects and features of the invention are defined in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
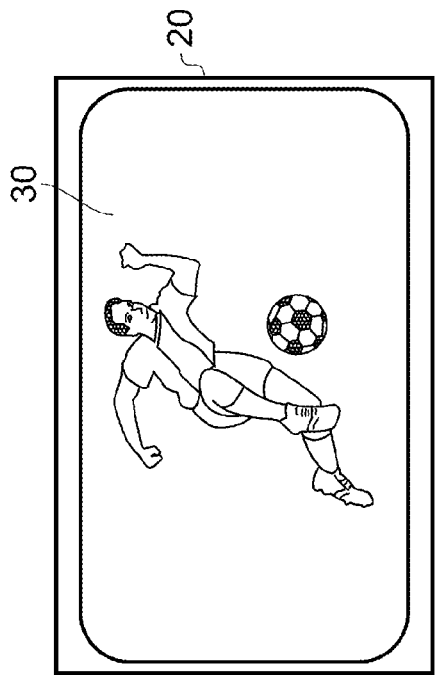
FIG. 1 schematically illustrates an arrangement for viewing 3D images on a sequential stereoscopic display.
Figure 1:

Referring now to the drawings, wherein like reference numerals designate identical or corresponding parts throughout the several views, FIG. 1 schematically illustrates an arrangement for viewing 3D images on a sequential stereoscopic display. A user 10 is watching a 3D image 30 on a sequential stereoscopic display 20. In order for the user to experience the correct illusion of depth, the user is required to where time-multiplexing glasses 40.

Figure 2:
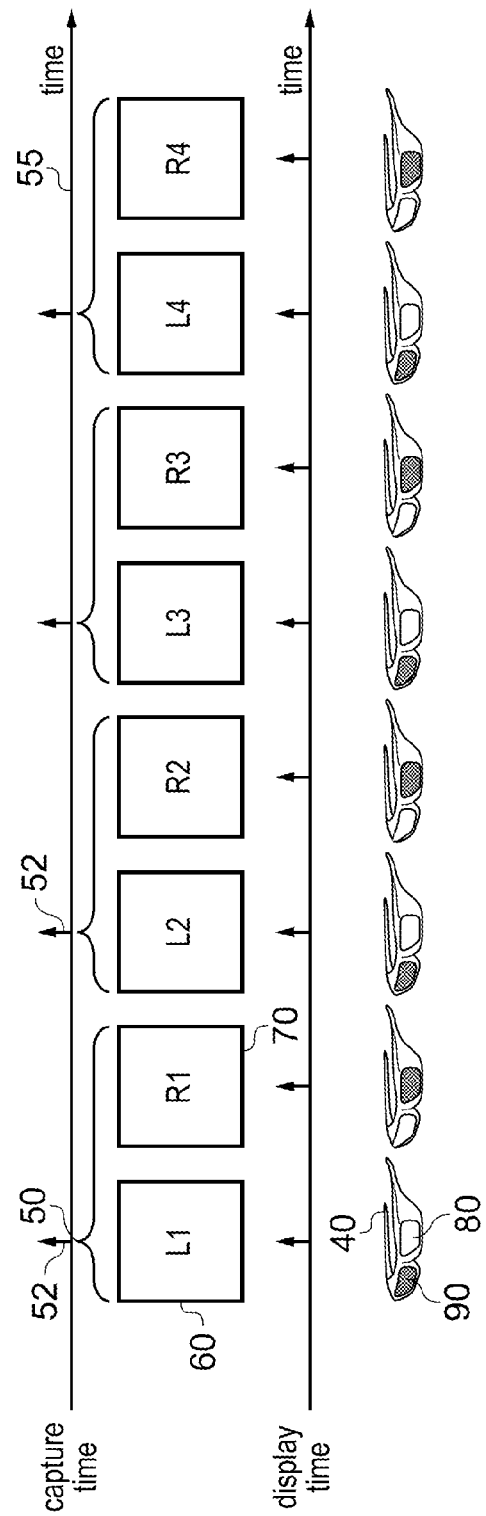
FIG. 2 schematically illustrates 3D image generation for a sequential stereoscopic display.

FIG. 2 schematically illustrates 3D image generation for a sequential stereoscopic display. 3D images are provided by means of successive stereoscopic image pairs 50 displayed at a predetermined frame rate. Each stereoscopic image pair 50 is comprised of a left image 60 and a right image 70. To help distinguish different image pairs, the images themselves are also numbered L1/R1, L2/R2 and so on, using the notation that left (L) and right (R) images from a particular image pair have the same digit associated with them, and the digits increase with time so that later-captured image pairs have higher associated digits.

The left and right images of a particular image pair are captured at the same instant, shown schematically as successive instants 52 on a time axis 55. The separation between the capture time of one image pair and the capture time of a next image pair is an image period, often also referred to as a frame period. An "image rate" is therefore the reciprocal of the "image period".

The left and right images are displayed half an image period out of synchronisation with respect to one another other. In the present example, the left image of an image pair is displayed first and then, half an image period later, the right image of that pair is displayed, replacing the left image. Accordingly, the two images are displayed for respective non-overlapping portions of an image period, the portions being such that the start of one portion is displaced from the start of an adjacent portion by half (or substantially half) of an image period.

When the left image 60 is displayed, a left lens 80 of the time-multiplexing glasses 40 remains substantially transparent whilst the right lens 90 becomes at least partially opaque, preventing at least a portion of light from the left image from reaching the right eye of the user. Then, half an image period later when the right image 70 is displayed, the right lens 90 becomes substantially transparent and the left lens 80 becomes at least partially opaque, preventing at least a portion of light from the right image from reaching the left eye of the user. Thus, in this way, the left eye of the user 10 mainly sees only the left image of each stereoscopic image pair and the right eye of the user mainly sees only the right image of each stereoscopic pair. This allows the user 10 to experience the pair of stereoscopic images 50 as a 3D image.

The lenses 80, 90 of the glasses 40 are not required to become completely transparent or completely opaque during the time multiplexing sequence. However, a higher extinction ratio, that is, a ratio between the light transmission when the lens is substantially transparent and the light transmission when the lens is at least partially opaque, will tend to give a more pleasing 3D effect for the viewer.

As mentioned, the successive left images in FIG. 2 have been labelled L1-L4, where L1 is the first left image that is displayed, L2 is the second left image that is displayed, and so on. Similarly, successive right images have been labelled R1-R4, where R1 is the first right image that is displayed, R2 is the second right image that is displayed, and so on. Only four image pairs are shown in FIG. 2, but it will be appreciated that these may form part of a significantly longer sequence of image pairs.

Note that although FIG. 2 illustrates a scenario where the left image 60 of each stereoscopic image pair 50 is displayed before the right image 70, it would be equally acceptable instead to display the right image 70 before the left image 60 of each image pair. In this case, the operation of the time-multiplexing glasses would be controlled so that first, the left lens 80 is made opaque and the right lens 90 is made transparent, and then, half an image period later, the right lens 90 is made opaque and the left lens 80 is made transparent. Apart from the Pulfrich effect to be discussed below, the 3D effect experienced by the user 10 would be the same in either arrangement. The order (left then right, or right then left) can be established by convention, by an agreed standard or by a control signal transmitted or recorded with the 3D video signal, or can (in the case of image pairs captured at the same instant) be left for the display device to select.

The lenses 80, 90 of the time-multiplexing glasses 40 may be made to alternate between transparent and opaque states via any suitable method. Examples of such glasses are already available, for example the TDG-BR100B™ Active Shutter Glasses sold by Sony® Corporation. One such method of alternating the light transmission is to manufacture each lens so that it comprises a liquid crystal element that may be electronically controlled to become transparent and opaque when necessary.

The time-multiplexing glasses 40 may also be synchronised with the sequential stereoscopic display apparatus 20 so that the occurrence of the transparent state of the left lens 80 and right lens 90 is in phase with the display of the left images 60 and right images 70, respectively. This synchronisation normally occurs by way of a wireless synchronisation signal sent from a transmitter (not shown) comprised within the sequential stereoscopic display apparatus 20 to a receiver (also not shown) comprised within the time-multiplexing glasses 40.

Figure 3:
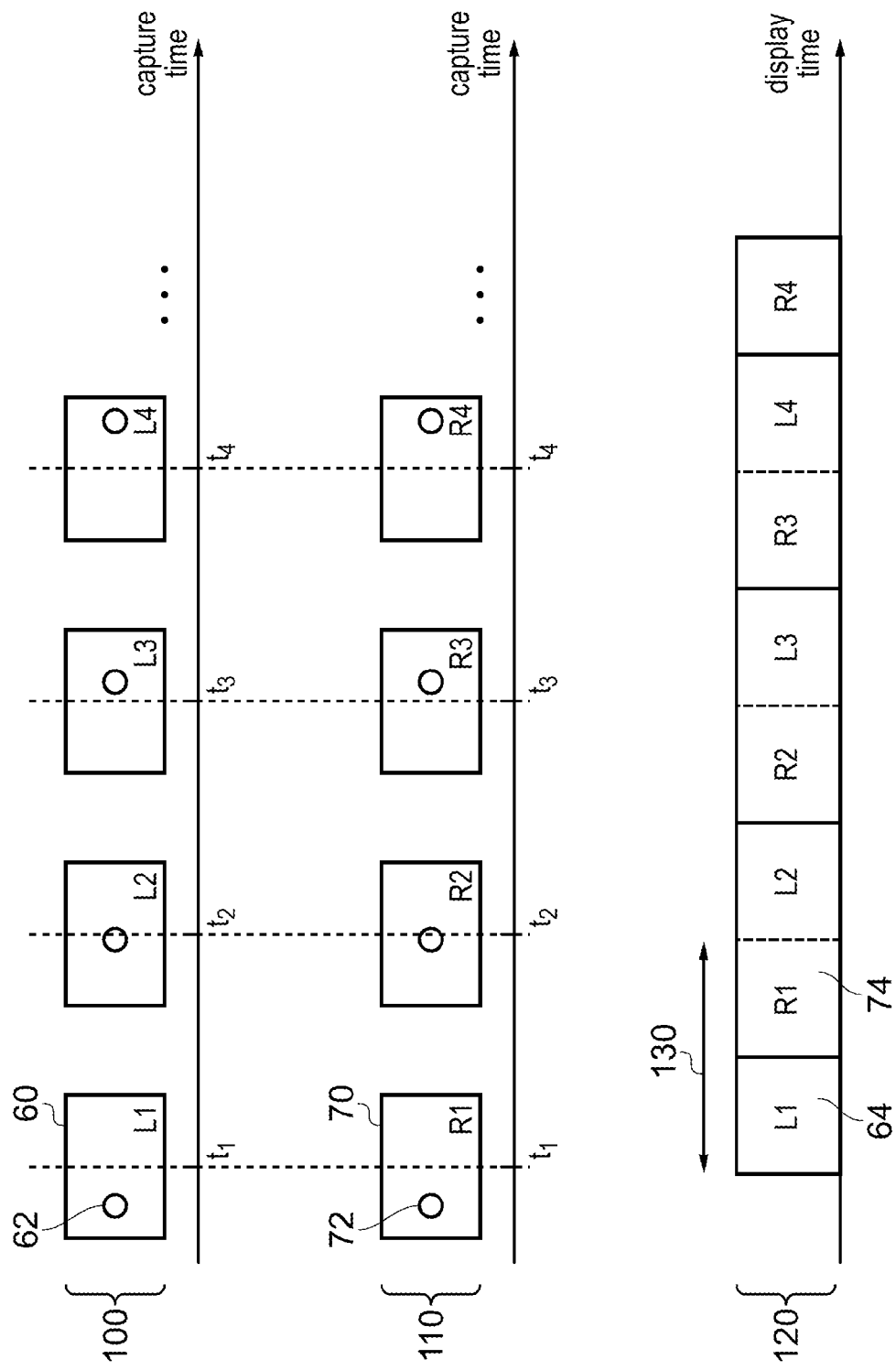
FIG. 3 schematically illustrates the relative timing intervals of image capture and image display when there is no parallax correction.

FIG. 3 schematically illustrates the relative timing intervals of image capture and image display in accordance with a conventional sequential stereoscopic display. Here, a sequence of left images 100 and a sequence of right images 110 are captured by separate cameras (not shown). The sequences 100 and 110 are captured in synchronisation with each other, so that each captured left image 60 is captured at the same instant in time as a corresponding right image 70 of the same image pair. Each captured left image 60 and its corresponding right image 70 thus have the same effective temporal position $t_1, t_2, t_3, t_4 \ldots$.

The image pairs include an image of a ball 62, 72 within each captured left and right image. It can be seen that the position of the image of the ball 62, 72 moves from left to right for successive captured image pairs. The position of the ball may differ slightly between the left and right images of an image pair, because of the way in which the 3D depth of the ball relative to the 3D camera arrangement is portrayed, but the real position of the ball in space, at the time of capture of an image pair, is of course the same for each of the left and right images of that image pair, because the left and right images are captured at the same instant.

Each left image 60 and its corresponding right image 70 form a stereoscopic image pair 50, and each stereoscopic image pair in a sequence of stereoscopic image pairs is displayed by means of first displaying the left image 60 and then, half an image period later, displaying the corresponding right image 70. The order of image display is illustrated on the bottom row of FIG. 3.

The timing intervals for the display of successive stereoscopic image pairs are illustrated by the image display intervals 120. The display of a stereoscopic image pair L1/R1 occurs during a display interval 130, which has a length which is no longer than the image period (that is to say, the period between an image capture time $t_n$ and the next image capture time $t_{n+1}$). Of course, the image display interval for an image pair n cannot start before the capture time $t_n$ of that image pair, but can in principle start at any time afterwards. In a live broadcast system, for example, the display interval in respect of an image pair could start maybe a few milliseconds to a few seconds after the capture time of that image pair.

For the first half of the display interval, the left image 60, which was captured at time $t_n$, is displayed. This is represented by a left image display interval 64. For the second half of the display interval, the right image 70, which was also captured at the time $t_n$, is displayed. This is represented by a right image display interval 74. Each of the successive stereoscopic image pairs 50 is displayed over a display interval in this way.

To illustrate the relationship between the images from the captured sequences of images 100, 110 and the image display timing intervals 120, the successive left images captured at times $t_1$-$t_4$ have been labelled with the notation L1-L4 (so that image L1 is captured at time $t_1$, image L2 is captured at time $t_2$, and so on) and the successive right images captured at times $t_1$-$t_4$ have been labelled R1-R4 (so that R1 is captured at time $t_1$, image R2 is captured at time $t_2$, and so on). The image display timing interval corresponding to each of the labelled images is then labelled in the same way, so that the time interval for which image L1 is displayed is also labelled L1, the time interval for which image R1 is displayed is also labelled R2, and so on.

Note that for the purposes of FIG. 3, each image in the sequences of left and right images 100, 110 is treated as though it is captured instantaneously. In reality, the capture of each image will actually occur over a short, non-zero capture interval. The capture times $t_n$ may therefore be considered as representing the end of those capture intervals. Similarly, the image display time intervals 120 shown indicate an instantaneous transformation from one image to the next. In reality, there may be a very short time gap between the ending of the display of one image and the beginning of the display of the next image. This short time gap may be necessary to allow, for example, each lens of the time-multiplexing glasses 40 to change to a transparent or opaque state, as appropriate. These short time gaps have been omitted from FIG. 3 for clarity.

The problem addressed by the present techniques can occur because although the left frame 60 and right frame 70 of each stereoscopic image pair 50 are captured at the same instant in time, for example, at $t_1$, they are actually displayed half an image period apart. For fast-moving objects, the fact that two images with the same effective temporal position are each displayed to a different eye at a different time can confuse the image processing system of the eyes and brain, resulting in the phenomenon known as the Pulfrich effect. The Pulfrich effect is schematically illustrated in FIGS. 4 and 5.

Figure 4:
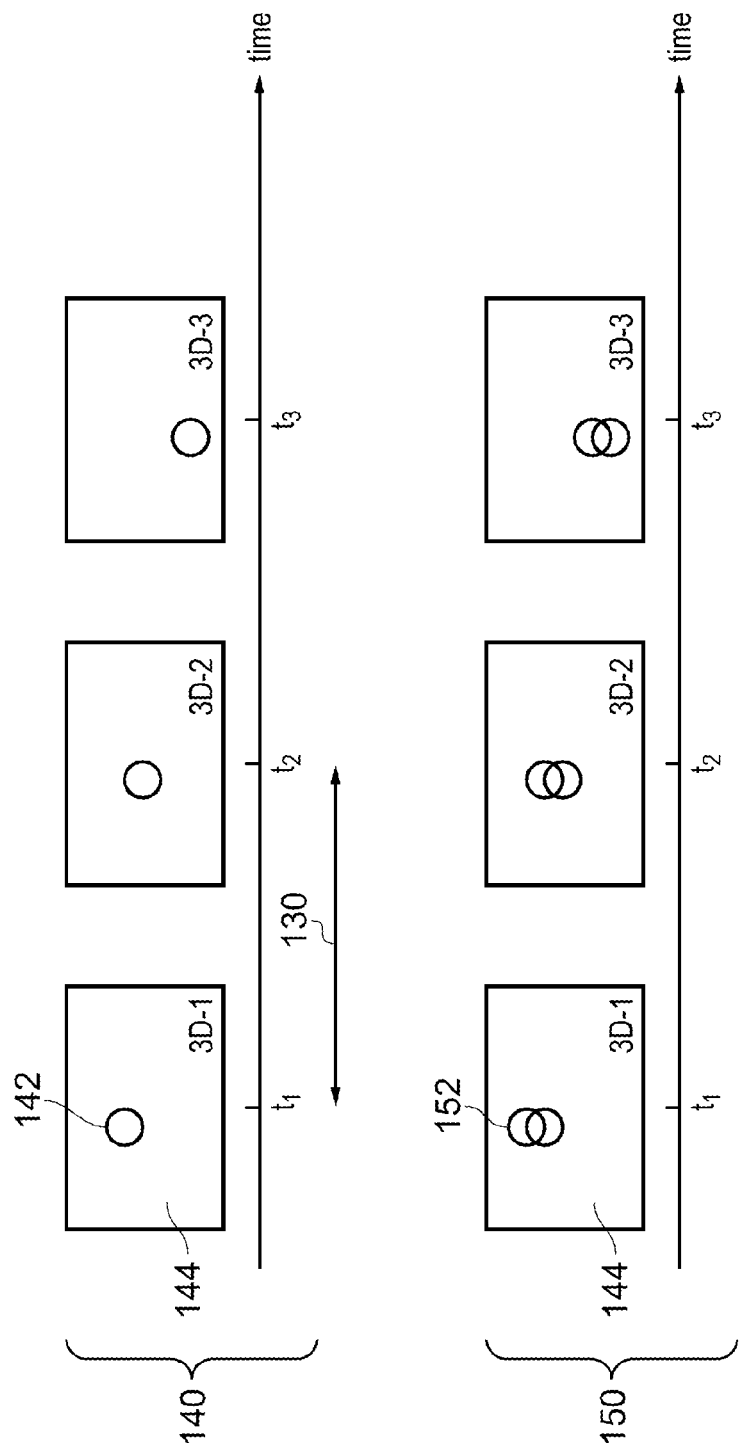
FIG. 4 schematically illustrates the Pulfrich effect for a vertically fast-moving object.
Figure 5:
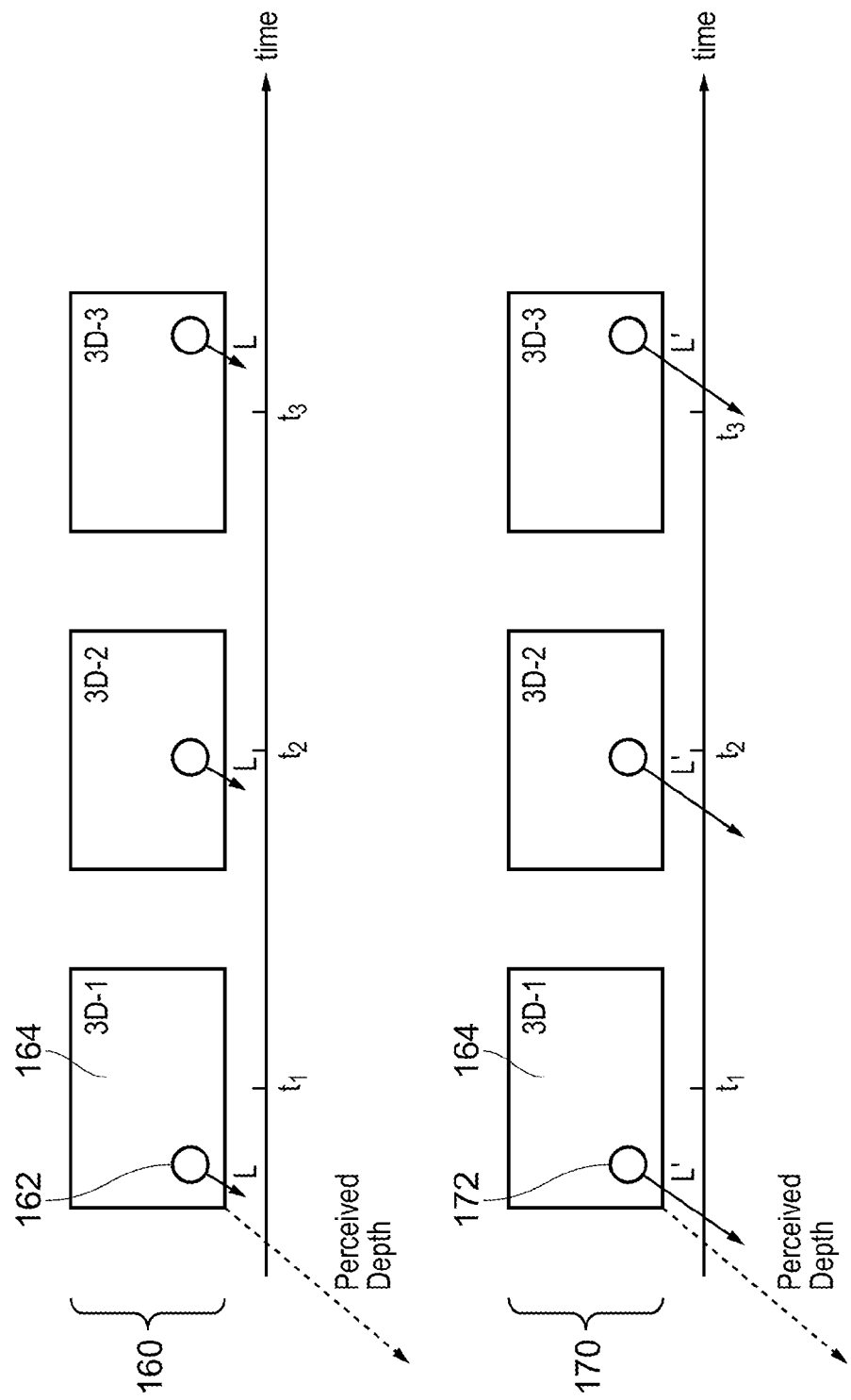
FIG. 5 schematically illustrates the Pulfrich effect for a horizontally fast-moving object.

FIG. 4 schematically illustrates the Pulfrich effect in the case of displaying a vertically fast-moving object on a sequential stereoscopic display. The drawing illustrates successive 3D image pairs of a 3D sequence as single rectangles labelled as 3D-n. Three successive 3D image pairs, 3D-1, 3D-2 and 3D-3, from an intended 3D image sequence 140 are shown as they are intended to be seen by the user. This intended 3D image sequence shows a fast-moving image of a ball 142 travelling in a generally vertical direction. It can be seen that the image of the ball 142 is in a different vertical position for each successive image. The ball is moving in front of a stationary background image 144, which does not change for the successively captured images 3D-1, 3D-2 and 3D-3.

The corresponding three successive 3D images 150 from the 3D image sequence as perceived by the user are also shown, bring the successive 3D images 3D-1, 3D-2 and 3D-3 as they are subjectively perceived by the user in the case of the occurrence of the Pulfrich effect. Because of the Pulfrich effect, the user experiences a misaligned image of the ball 152.

The reason for the Pulfrich effect is that although each of the 3D images 3D-1, 3D-2 and 3D-3 are shown (for simplicity) as being displayed at instants in time $t_1$, $t_2$ and $t_3$, they are in fact, in accordance with that previously described, each displayed by means of a stereoscopic image pair. This stereoscopic image pair comprises a left image and a right image, which are each displayed for half the image period 130.

Because the left and right images of each stereoscopic image pair are captured at the same time (and thus have the same effective temporal position) but are then displayed half an image period out of synchronisation, the way in which the eyes and brain of the user interpret the successive image pairs results in the user experiencing the misaligned image 152.

Since the background image 144 does not change from frame to frame, this background portion of the image will not become misaligned due to the Pulfrich effect. This is because the Pulfrich effect is only subjectively noticeable for parts of a displayed image that are moving above a particular threshold speed. This magnitude of this particular speed will depend at least in part on the rate at which successive stereoscopic image pairs are captured and displayed. Accordingly, the background image 144 does not have to be stationary in order to it not to appear misaligned to the user. It could be moving, but not at a speed great enough for the Pulfrich effect to be noticeable.

The way in which the 3D images 3D-1, 3D-2 and 3D-3 are illustrated suggests that each image appears flat to the user (that is, the user perceives the misaligned image of the ball 152 as being at the same depth as the background image 144). This could indeed be the case. It could, however, equally be the case that the image has depth (that is, the user perceives the misaligned image of the ball 152 as being closer than the background image 144). The Pulfrich effect, which results in the user experiencing the misaligned image of the ball 152 will be the same.

FIG. 5 schematically illustrates the Pulfrich effect in the case of displaying a horizontally fast-moving object on a sequential stereoscopic display.

Three successive 3D images, again labelled 3D-1, 3D-2 and 3D-3, from an intended 3D image sequence 160 are shown as they are intended to be seen by the user. This intended 3D image sequence shows a fast-moving image of a ball 162 travelling in a horizontal direction, from left to right. It can be seen that the image of the ball 162 is in a different horizontal position for each successive 3D image as it moves from left to right across a stationary background image 164. Apparent depth is indicated schematically by an oblique arrow, with a longer arrow indicating a greater depth in a direction out of the page, or in other words, a longer arrow indicates an object which the user perceives is closer to him or her.

It can be seen that for each of the images 3D-1, 3D-2 and 3D-3 in the intended 3D image sequence 160, the ball is at a correct constant depth L. The constant depth L is measured with respect to the depth of the stationary background image 164. The stationary background image 164 does not change for the successively captured images 3D-1, 3D-2 and 3D-3.

The corresponding three successive 3D images from the perceived 3D image sequence 170 are also shown. These show the successive 3D images 3D-1, 3D-2 and 3D-3 as they are perceived by the user in the case of the occurrence of the Pulfrich effect. Because of the Pulfrich effect, the perceived image of the ball 172 appears at a greater depth, appearing closer to the user than is intended. It can be seen that for each of the perceived images 3D-1, 3D-2 and 3D-3, the ball is at an incorrect depth L', where L'>L. Again, the depth L' is measured with respect to the stationary background 164.

The Pulfrich effect occurs for the same reason as that previously described for FIG. 4, in that although each of the 3D images 3D-1, 3D-2 and 3D-3 are shown (for simplicity) as being displayed at instants in time $t_1$, $t_2$ and $t_3$, they are in actual fact each displayed by means of successive stereoscopic image pairs where the left image of each pair is displayed half a frame out of synchronisation with the right image of each pair, even though the left image and right image will have been captured at the same instant in time (and will thus have the same effective temporal position). For vertically fast-moving objects, the way in which the eyes and brain of the user process this disparity causes the user to experience a misaligned image of the object. For horizontally fast-moving objects, the way in which the eyes and brain of the user process this disparity causes the user to perceive the depth of the object incorrectly.

The illustrated incorrectly perceived depth L' of the fast moving image of the ball 172 as it moves from left to right in the three successive 3D images of the perceived 3D image sequence 170 is specific to the case where the right image of each stereoscopic image pair is delayed with respect to the left image. In the alternative case, where the left image of each stereoscopic image pair is delayed with respect to the right image, then the perceived image of the ball 172 will (incorrectly) appear at a reduced depth, appearing further away from the user than is intended. It should also be noted that, returning to the original case where the right image is delayed with respect to the left image, the perceived image of the ball 172 will (incorrectly) appear further away from the user when the ball is moving from right to left (rather than nearer to the user when the ball is moving from left to right, as illustrated in FIG. 5). Correspondingly, for the alternative case where the left image is delayed with respect to the right image, the perceived image of the ball 172 will (incorrectly) appear closer to the user when the ball is moving from right to left (rather than further away from the user when the ball is moving from left to right).

Since the background image 164 does not change from frame to frame, a change in the depth of this background image will not be experienced by the user. Again, this is because the Pulfrich effect is only noticeable for parts of a displayed image that are moving above a particular speed. This magnitude of this particular speed will depend on the rate at which successive stereoscopic image pairs are captured and displayed. Accordingly, the background image 164 does not have to be stationary in order for the user to not experience a change in its depth. It could be moving, but not at a speed great enough for the Pulfrich effect to be noticeable.

Although FIGS. 4 and 5 separately illustrate the Pulfrich effect for vertically and horizontally fast-moving objects, respectively, the Pulfrich effect may also occur as a combination of the effects described in FIGS. 4 and 5 in the case that a fast-moving object has both fast-moving horizontal and fast-moving vertical velocity components.

Figure 6:
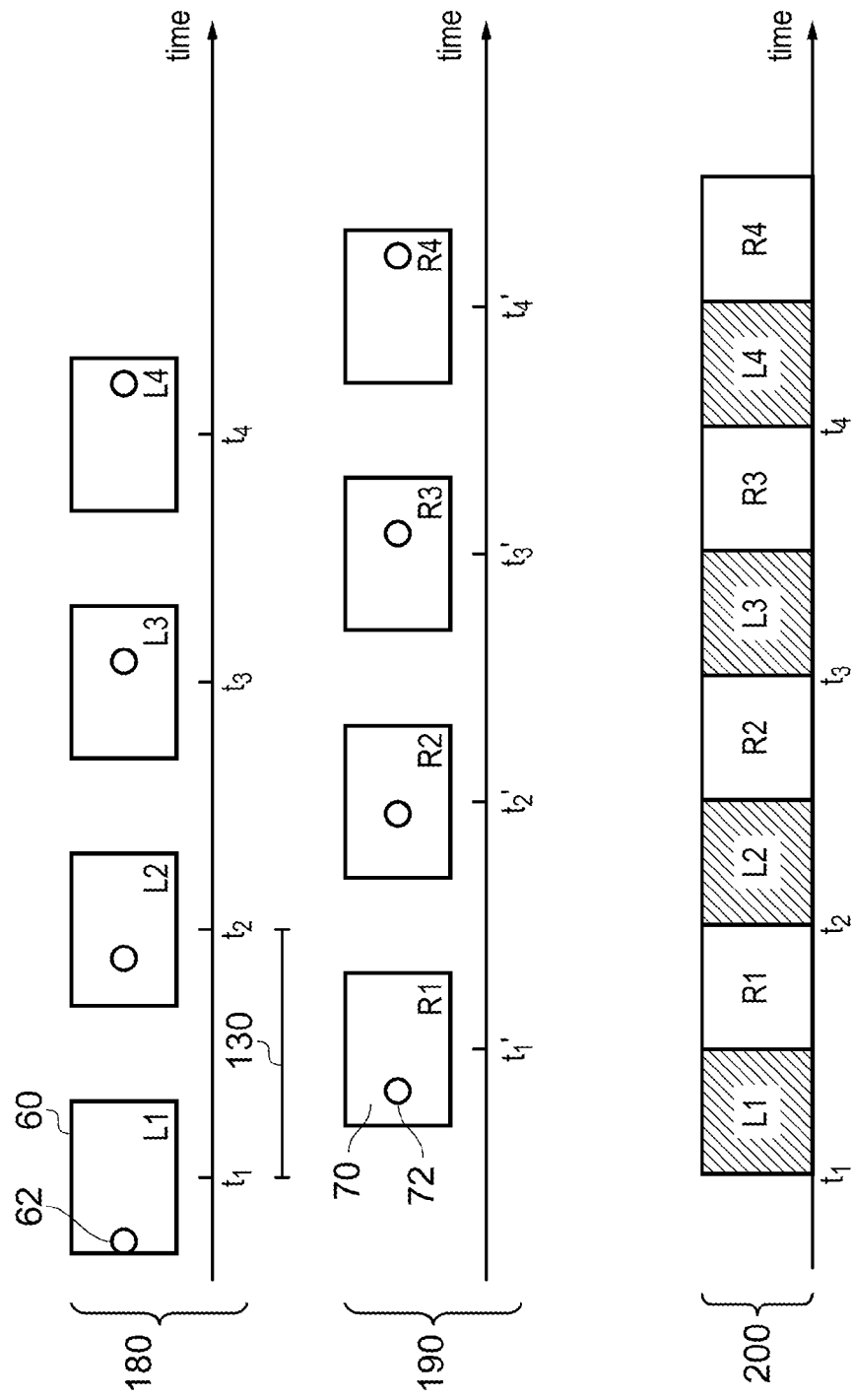
FIG. 6 schematically illustrates the relative timing intervals of image capture and image display when parallax correction occurs in accordance with a first embodiment of the invention.

FIG. 6 schematically illustrates the relative timing intervals of image capture and image display when alleviation of the problems of image misalignment and depth perception described previously occurs in accordance with a first embodiment of the invention. This alleviation will be referred to here as parallax correction. It is noted that the term "parallax correction" implies that measures are taken to try at least to alleviate the problems described above; the term does not necessarily imply that the problems are entirely eliminated, although in certain embodiments this can be achieved.

This first embodiment achieves parallax correction by ensuring that each of the left images in the captured sequence of left images 180 is captured at a different time to its corresponding right image in the captured sequence of right images 190. For example, each of the left images could be captured half an image period before its corresponding right image. The result of this is that for each stereoscopic image pair 50, the effective temporal position (the capture time) of the left image 60 and the effective temporal position of the right image 70 are separated by half the image period 130. The effective temporal position of each left image is indicated by the position of the left ball image 62. Similarly, the effective temporal position of each right image is indicated by the position of the right ball image 72.

Embodiments of the invention can provide a method of generating and/or displaying stereoscopic image pairs such that the effective temporal positions of the left and right images of a stereoscopic image pair for display are different. One way of achieving this is to capture the left and right images at different respective times. Another way is to capture the left and right images at the same instant (for a particular stereoscopic image pair) but then to process, for example by motion-compensated interpolation, one or more of the left and right images so that the effective temporal positions of the left and right images are different.

In all of the embodiments, a sequence of images suitable for a left eye of a viewer is captured at a predetermined image rate, such as 25, 30, 50 or 60 images per second. A sequence of images suitable for a right eye of a viewer is also captured at the predetermined image rate. Stereoscopic image pairs comprising left and right images derived from respective pairs of the captured images for the left and right eye are displayed (or generated for display as the case may be) at the predetermined image rate. The display technique used is a time-alternating display technique in which the left and right images of a stereoscopic image pair are displayed for different respective single non-overlapping portions of an image period defined by the predetermined image rate. In embodiments of the invention, the portions of the image period (for the left and right images respectively) have the same length, and in embodiments of the invention the start of the portion of the image period relating to the left image is temporally displaced from the start of the portion of the image period relating to the right image by a displacement substantially equal to half of an image period.

It should be noted that although embodiments of the invention define the captured left and right images as being captured by a pair of real (live action) cameras, the images may also be captured by virtual (computer animation) cameras. Stereoscopic image pairs may also be created by artists manipulating 2-D images. All types of stereoscopic image pairs, however, will benefit from the parallax correction provided by embodiments of the present invention.

Figure 7:
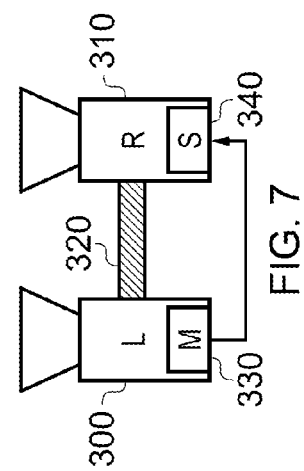
FIG. 7 schematically illustrates a first embodiment of a 3D camera apparatus operable to capture left and right images which are temporally out of synchronisation with one another.

FIG. 7 schematically illustrates a first embodiment of a 3D camera apparatus operable to capture left and right images which are temporally out of synchronisation with one another.

In particular, FIG. 7 schematically illustrates a 3D video camera comprising two cameras 300, 310, held in a laterally (that is, in a horizontal image direction) spaced-apart arrangement by an arrangement shown schematically as a bracket 320. The spacing apart of the two cameras allows the capture of 3D images at a predetermined image rate in which the respective left and right image of each 3D image pair is captured from a different spatial position.

In the present embodiments, the two cameras are out of phase by half of an image period, in respect of their capture of the left and right images. The phase difference could work in either direction, but in the present example discussed with reference to FIG. 6 above, the right image of each image pair is captured half of an image period after the left image of that image pair.

The cameras make use of synchronising circuits 330, 340 which provide the necessary synchronisation signals to operate the image capture process within each respective camera. In this example, the left camera 300 has a master synchronisation circuit 330 and the right camera 310 has a slave synchronisation circuit 340. The master synchronisation circuit is either free-running (in which case it is not controlled by any other signal source) or optionally can be controlled by a central synchronisation signal source such as a studio synchronisation feed. The slave synchronisation circuit 340 is controlled by the master synchronisation circuit 330. The effect of this control process is that the slave synchronisation circuit 340 aligns its frequency and phase of image capture to those of the master synchronisation circuit 330, except for a phase difference (a lag in this example) of half of one image period.

Figure 8:
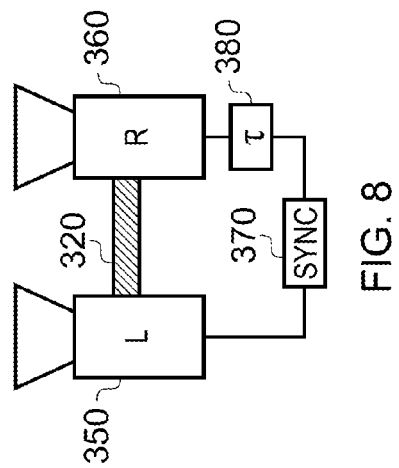
FIG. 8 schematically illustrates a second embodiment of a 3D camera apparatus operable to capture left and right images which are temporally out of synchronisation with one another.

FIG. 8 schematically illustrates a second embodiment of a 3D camera apparatus operable to capture left and right images which are temporally out of synchronisation with one another.

Once again, FIG. 8 illustrates respective left (350) and right (360) cameras, mechanically linked to one another in a lateral spaced-apart relationship by a schematic bracket 320. Image capture synchronisation for the two cameras is provided by a synchronisation circuit (or other source of synchronising signals) 370. The circuit 370 can output two synchronisation signals which are identical in frequency but shifted in relative phase by half of one image period, and supply these to the respective left and right cameras 350, 360. Alternatively, the synchronisation circuit 370 can output identical synchronisation signals, one of which is then subject to a relative delay (that is to say, relative to the other camera's synchronisation signal) of half of one image period, for example by a delay element shown schematically as an element 380 in FIG. 8.

The embodiments described so far have made use of different capture times for the respective left and right images of a 3D image pair. Embodiments will now be described in which the respective left and right images of a 3D image pair (also known as a stereoscopic image pair) are captured at the same time, but processing is applied before the images are displayed, in order to alter the effective temporal position of at least one of the images of each image pair.

Figure 9:
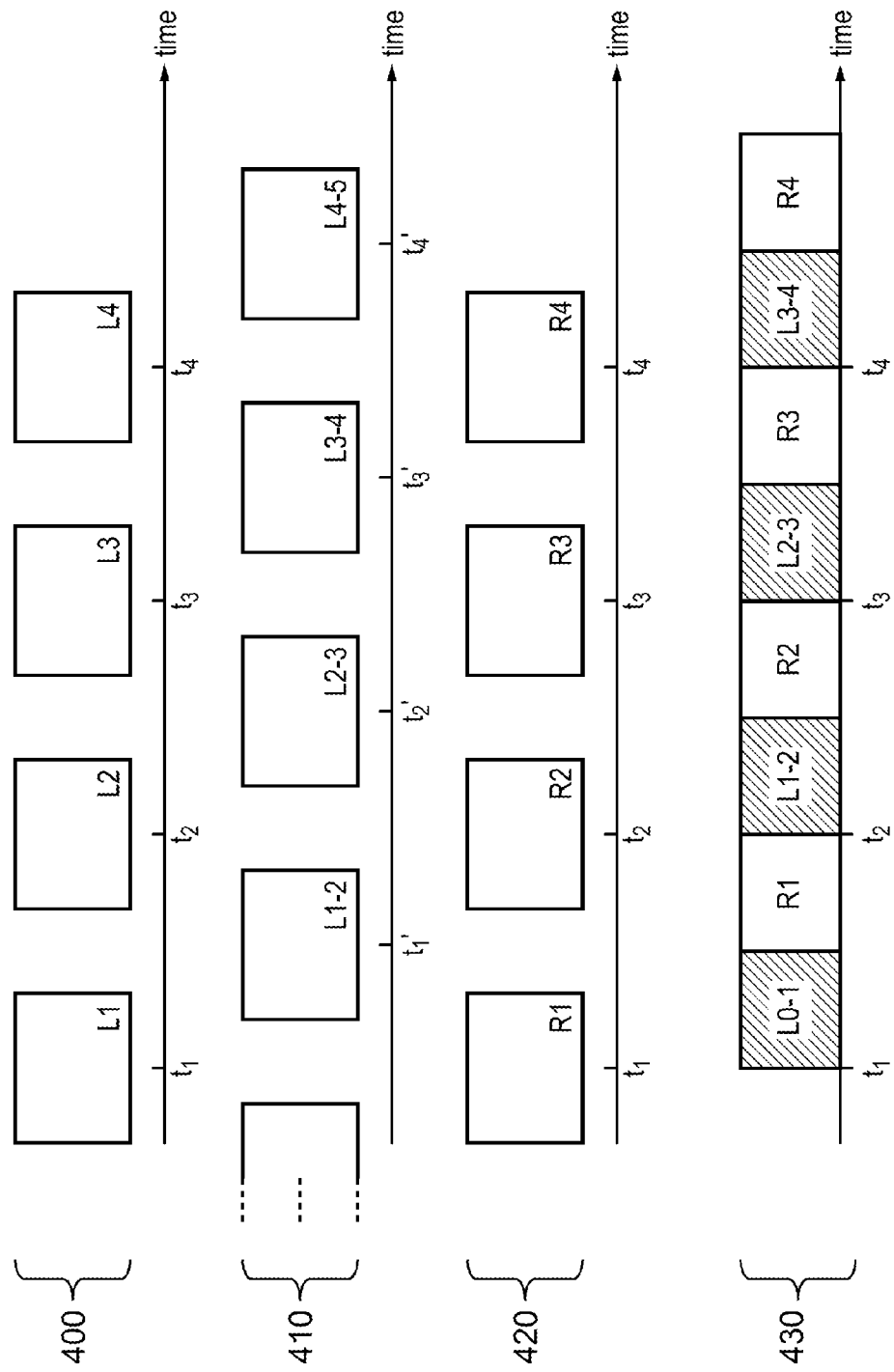
FIG. 9 schematically illustrates the relative timing intervals of image capture and image display when parallax correction occurs in accordance with a second embodiment of the invention.

An example of this type of process is shown schematically in FIG. 9. A top row 400 of FIG. 9 illustrates the capture times of successive left images (L1 ... L4) of a 3D image sequence. Each image is captured at a respective capture time $t_1 \ldots t_4$. A third row 420 of FIG. 9 illustrates the capture times of the corresponding successive right images (R1 . . . R4) of the sequence. Again, each image is captured at a respective capture time $t_1 \ldots t_4$. So, it can be seen that the capture times of the two (left and right) images forming an image pair are the same.

A second row 410 of FIG. 9 schematically illustrates a set of left images which are interpolated so as to have effective temporal positions halfway between the capture times of the successive captured left images. So, for example, an interpolated left image L1-2 has an effective temporal position of $t_1'$, which is halfway between the times $t_1$ (the capture time of the left image L1) and $t_2$ (the capture time of the left image L2).

In simple terms, the interpolated left image L1-2 may be derived from the two surrounding left images L1 and L2. This can be achieved using, for example, motion-compensated interpolation; an example process will be described below with reference to FIGS. 16 and 17. In practice, the interpolation might take into account other surrounding images such as an image L0 (not shown in FIG. 9, but preceding the image L1) and L3. The exact choice of interpolation technique is not relevant to the underlying principles of the present embodiments, and the skilled person will, in the light of the teaching provided in the present application, choose an appropriate interpolation technique.

An advantage of using motion-compensated interpolation is that a moving object will generally appear in the interpolated image at the correct image position corresponding to the effective temporal position of that interpolated image. So, for example, if an object is moving between a position A in the image L1 and a position B in the image L2, motion-compensated interpolation of the image L1-2 will mean that the moving object appears at the correct position in the image L1-2 relevance to the interpolated time $t_1'$. So, if the time $t_1'$ is half-way between $t_1$ and $t_2$, the position of the object in the interpolated image L1-2 using motion compensated interpolation would be expected to be half-way between the image positions A and B.

A fourth row 430 of FIG. 9 schematically illustrates the display of the images for the user, which in this example involves displaying the captured right images and the interpolated left images. Here, two features need to be considered: the system retains the feature of displaying left images before right images, and an interpolated image cannot of course be displayed until it has been generated. So (for example) the interpolated image L1-2, which is generated from the images L1 and L2, cannot be displayed until the capture time of L2 at the very earliest. In practice, there is likely to be a short further delay while the interpolation process is carried out, but for simplicity of the diagram this delay is not illustrated in FIG. 9.

The resulting display sequence shown in the row 430 of FIG. 9 alternates between interpolated left images and captured right images, with the effective temporal position of each image being half of one image period separated from the effective temporal position of the immediately preceding or the immediately following displayed image. In other words, because the images are displayed half of one image period apart and have an effective temporal position half of one image period apart, the Pulfrich effect does not occur for the viewer of this displayed sequence.

Figure 10:
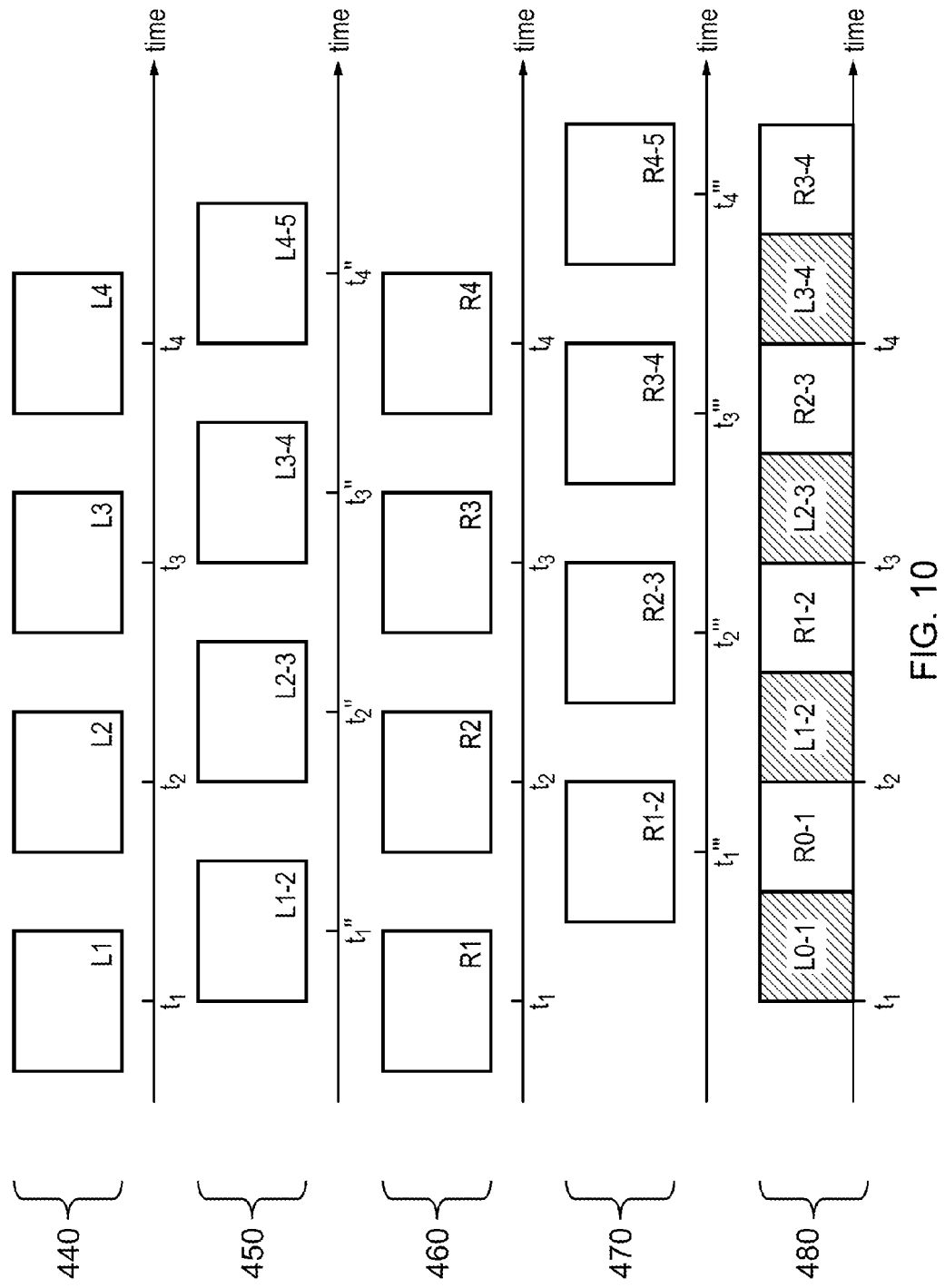
FIG. 10 schematically illustrates the relative timing intervals of image capture and image display when parallax correction occurs in accordance with a third embodiment of the invention.

FIG. 10 schematically illustrates another example embodiment in which both the left and right images are interpolated from the captured images.

One reason why it may be appropriate to interpolate both the left and right images is that an interpolated image can look a little different to a "raw" captured image, because of the filtering processes involved in the interpolation. So, a potential feature of the arrangement shown in FIG. 9 is that the images presented to the left and right eyes may potentially have slightly different characteristics, even if the original cameras were identical and had identical settings. This can be undesirable for the viewer. So, in FIG. 10, both sets of images (left and right) for display are interpolated, which means that any filtering or other artefacts introduced by the interpolation process should in theory apply equally to both the left and the right images. In order to achieve the desired half-image-period offset in effective temporal position between the left and right images, the interpolation processes are arranged in this example so as to generate output left and right images at different respective effective temporal positions.

A top row 440 of FIG. 10 schematically illustrates the captured left images L1 . . . L4 having capture times $t_1 \ldots t_4$. A third row 460 of FIG. 10 schematically illustrates the captured right images R1 . . . R4 also having capture times $t_1 \ldots t_4$. A second row 450 of FIG. 10 illustrates interpolated left images L1-2, L2-3 and so on, and a fourth row 470 illustrates interpolated right images R1-2, R2-3 and so on.

The left images are interpolated so as to have effective temporal positions $t_1'' \ldots t_4''$, each of which is separated from a preceding capture time (for example $t_1$ in the case of $t_1''$) by one quarter of an image period, and therefore from a following capture time (for example $t_2$ in the case of $t_1''$) by three quarters of an image period.

The right images are interpolated so as to have effective temporal positions $t_1''' \ldots t_4'''$, each of which is separated from a preceding capture time (for example $t_1$ in the case of $t_1'''$) by three quarters of an image period, and therefore from a following capture time (for example $t_2$ in the case of $t_1'''$) by one quarter of an image period.

The result of course is that the effective temporal positions of the respective left and right images of an interpolated image pair (for example L1-2 and R1-2) are separated by half of one image period.

A fifth row 480 of FIG. 10 schematically shows the display order of the interpolated images. Once again, it is noted that an image cannot be displayed until it has been generated, which in turn requires the capture of the later of the images on which the interpolated image depends. As with FIG. 9, the processing delay required to interpolate the images has not been shown, for simplicity of the diagram.

Apparatus for interpolating images according to the schemes shown in FIGS. 9 and 10 will now be described with reference to FIGS. 11 and 12.

Figure 11:
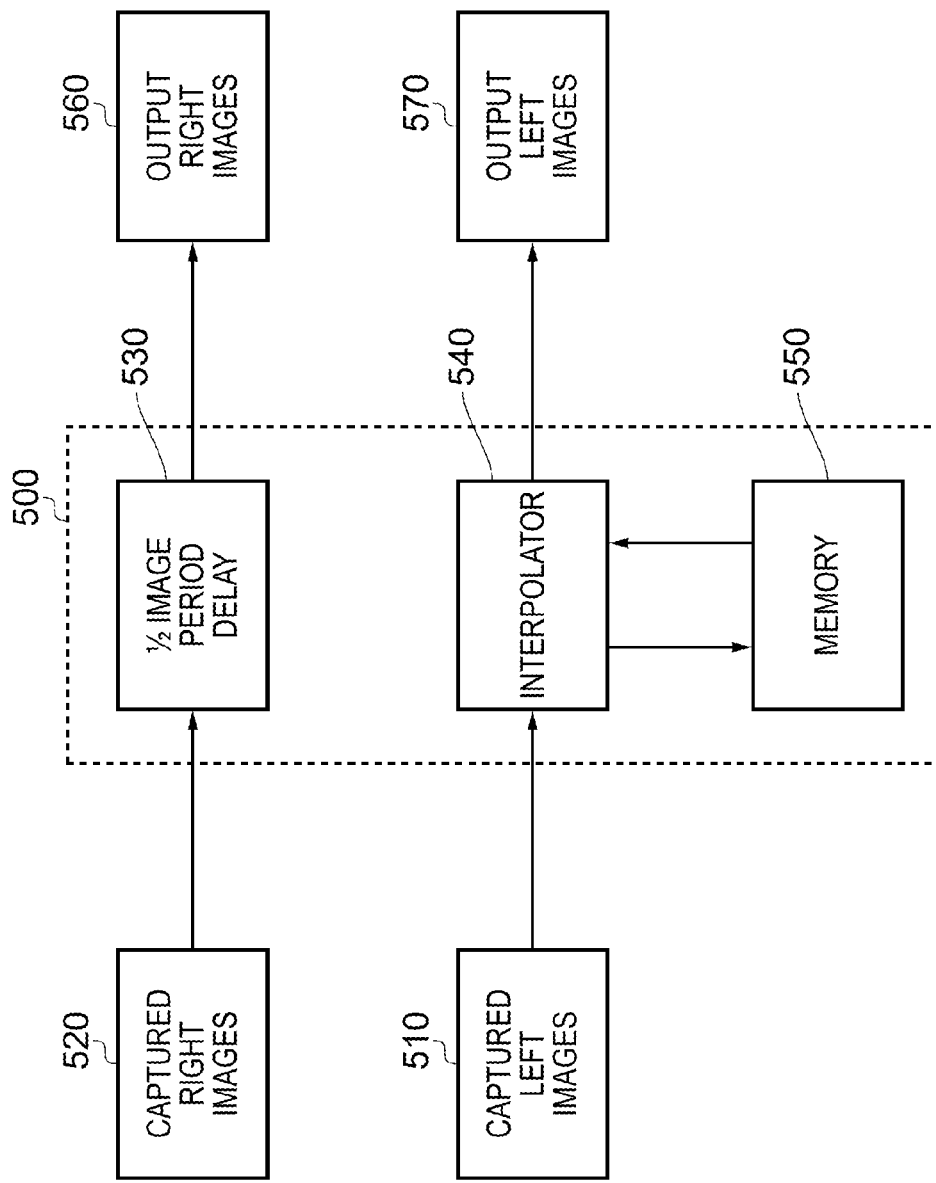
FIG. 11 schematically illustrates an arrangement for performing parallax correction in accordance with the second embodiment of the invention.

FIG. 11 schematically illustrates an arrangement for interpolating just one of the left and right images, in accordance with the scheme shown in FIG. 9. In the present example, it is the left images which are interpolated, but of course in other embodiments it could be just the right images which are interpolated.

Referring to FIG. 11, an interpolation processor 500 acts on captured left images 510 and captured right images 520. The interpolation processor 500 comprises a delay unit 530, an interpolator 540 and an image memory 550.

The delay unit 530 applies a half image period delay to all of the captured right images 520 to produce the output right images 560. So, the output right images 560 are identical to the captured right images 520 except for a temporal delay of half of an image period. The reason why a delay is required is as follows. It was noted in the discussion of FIG. 9 that the interpolated left images cannot be displayed until they have been generated, which in turn requires that the later of the captured left images on which an interpolated image depends has to have been captured. This means that, for example, the interpolated left image L1-2, which has an effective temporal position between that of the left image L1 and that of the left image L2, cannot in fact be displayed until after the capture time of the left image L2. In turn, the right image R2 is displayed half an image period after the interpolated left image L1-2. Because the capture times of the image L2 and the image R2 are the same, this means that the right image R2 cannot be displayed until half an image period after its own capture time, as a minimum. For this reason, the captured right images are delayed in the interpolation processor 500 by the delay unit 530, for half an image period before being output.

With regard to the captured left images, these are processed by the interpolator 540 to generate output left images 570. The operation of the interpolator 540 will be discussed below with reference to FIGS. 16 and 17. The temporal effect of the interpolator 540 is to generate output images having effective temporal positions halfway between the respective capture times of the adjacent captured left images.

Because the interpolation operation depends upon more than one image, the memory 550 is used to buffer the source (captured) images on which the interpolation process is based.

Figure 12:
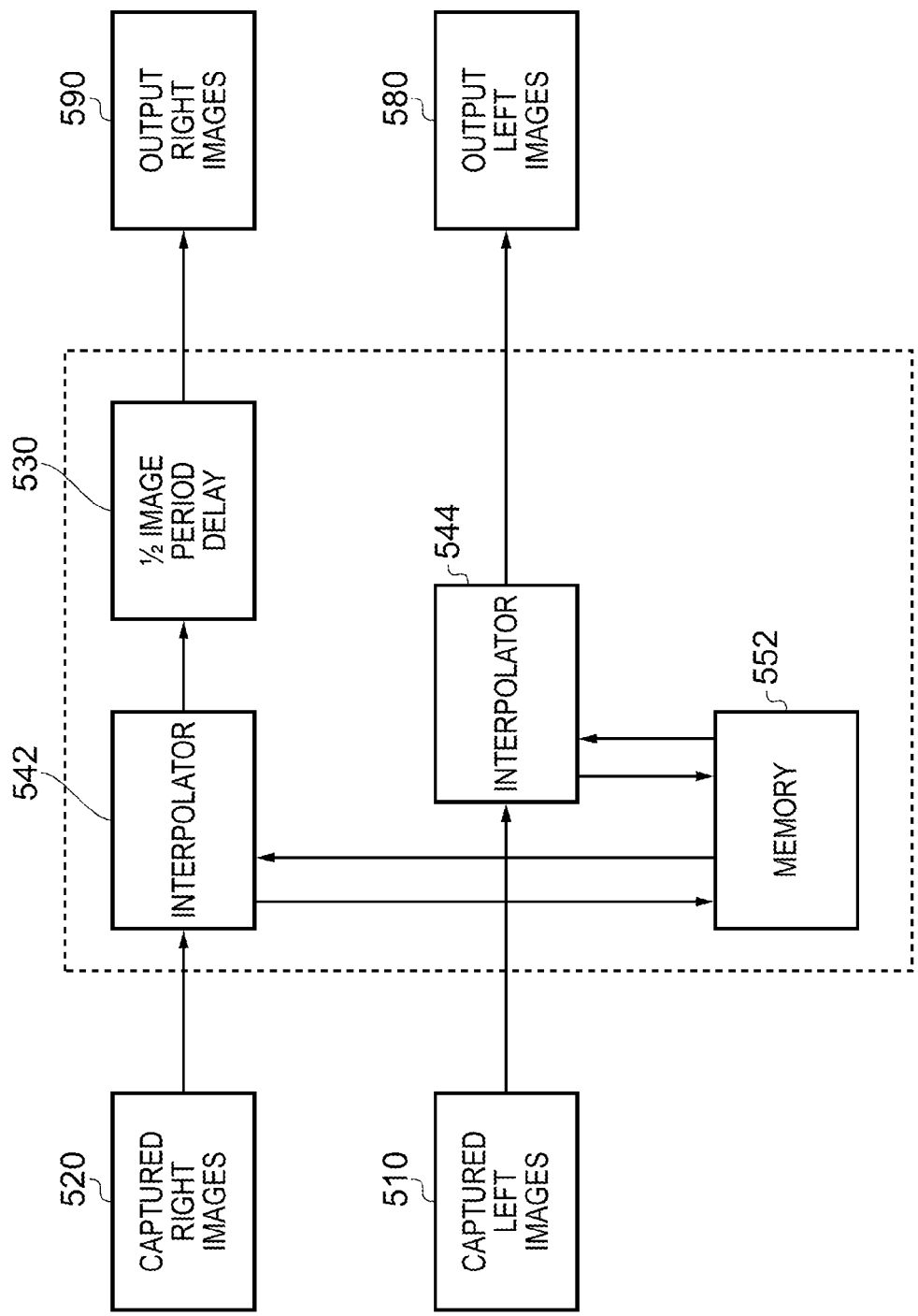
FIG. 12 schematically illustrates an arrangement for performing parallax correction in accordance with the third embodiment of the invention.

FIG. 12 schematically illustrates a similar arrangement, but relevant instead to the interpolation pattern shown in FIG. 10. Here, both the captured left and right images 510, 520 are interpolated to generate respective output left and right images 580, 590. Accordingly, two interpolators 542, 544 are used for the respective right and left image streams. The interpolators make use of a memory 552 to provide temporary storage of source (captured) images on which the interpolated output images depend.

As discussed above, the two interpolators 542, 544 operate to generate interpolated output images which are separated from one another (in terms of their effective temporal position) by half an image period. One example of how to do this was shown in FIG. 10, which provided a symmetrical arrangement in which the left images were interpolated at 0.25 of an image period from the preceding capture point, and the right images were interpolated at 0.75 of an image period from the preceding capture point, giving the required half image period separation. However, any other arrangement is acceptable, such as 0.1, 0.6 offsets, if the eventual output left and right images are to be separated in terms of their effective temporal position by half of an image period.

As before, a half image period delay is applied to the interpolated right images so that they are output at an appropriate time for display.

The interpolation arrangement of FIG. 11 or FIG. 12 can find many applications in the overall single chain of a 3D video system. One example is shown schematically in FIG. 13, which illustrates a 3D camera system having left and right cameras 600, 610 linked by a schematic lateral spacing bracket 320 as described above. The cameras are arranged to capture their respective images at the same capture times, and an interpolation arrangement 620 similar to that shown in FIG. 11 or FIG. 12 is provided to generate Pulfrich-corrected (or parallax-corrected) image streams L', R'.

Figure 13:
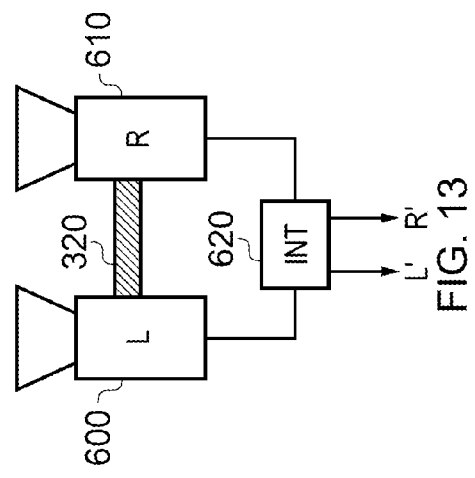
FIG. 13 schematically illustrates a 3D camera apparatus operable to perform parallax correction on captured left and right images.

It should be noted that although in FIGS. 7, 8 and 13, the stereoscopic camera arrangement comprises two cameras side by side, other arrangements are possible, such as arrangements which use beam-splitter mirrors to get the optical axes of the cameras closer together. It is always the case, however, that the optical axes of the cameras are arranged side by side.

Figure 14:
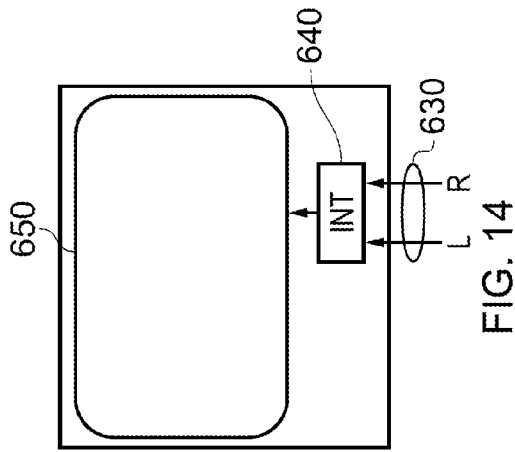
FIG. 14 schematically illustrates a sequential 3D display apparatus operable to perform parallax correction on input left and right images before they are displayed.

FIG. 14 schematically illustrates a sequential 3D display apparatus which receives a 3D input signal 630 comprising left and right images having identical capture times. An interpolation arrangement 640 similar to that shown in FIG. 11 or FIG. 12 is provided to generate streams of left and right images for display on a display screen 650 according to the principles described with reference to FIG. 9 or FIG. 10.

Figure 15:
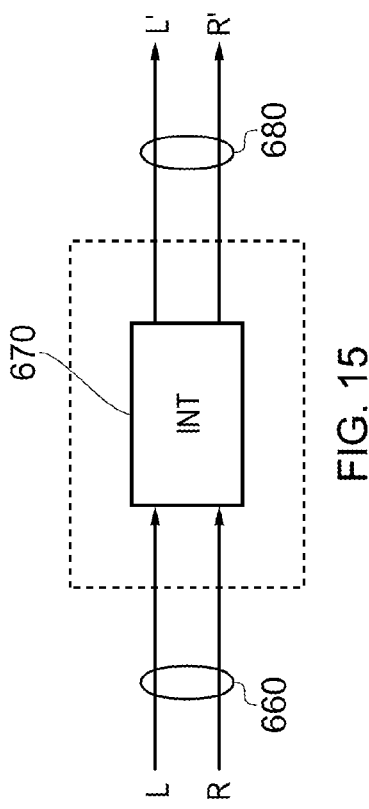
FIG. 15 schematically illustrates a parallax correction apparatus operable to receive uncorrected left and right images and output corrected left and right images.

FIG. 15 schematically illustrates a stand-alone parallax correction apparatus which receives input 3D signal 660 comprising left and right images of successive image pairs, having identical capture times. An interpolation arrangement 670 operates according to the principles shown in FIG. 9 or 10 to generate parallax-corrected output images 680. So, the apparatus of FIG. 15 generates images for display, but does not itself display the images.

Figure 16:
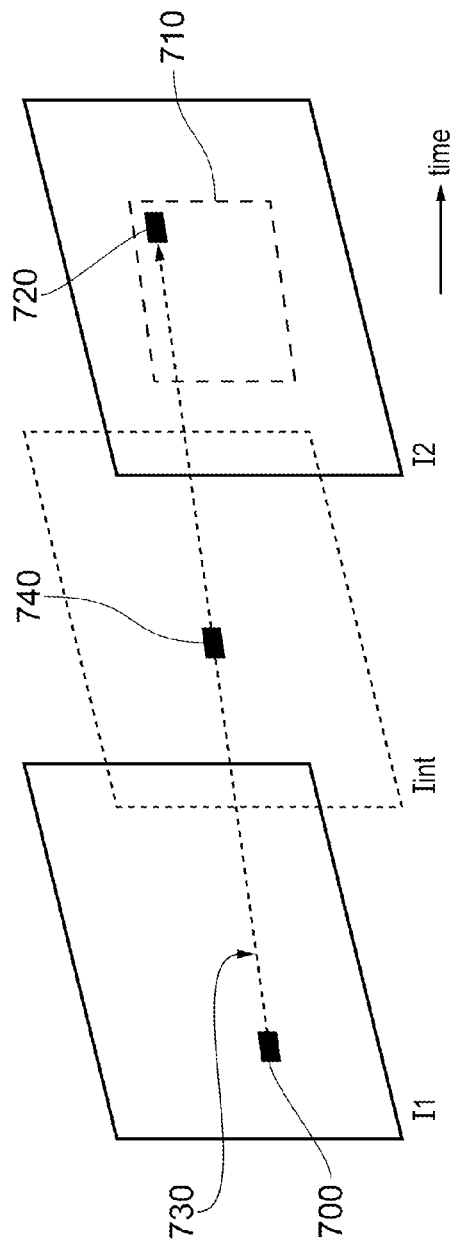
FIG. 16 schematically illustrates motion compensated interpolation.

FIG. 16 schematically illustrates a motion compensated interpolation technique. The arrangement shown in FIG. 16 is generic to any of the interpolation schemes described above. In FIG. 16, an interpolated image $I_{int}$ is generated by interpolation between a pair of temporally adjacent images I1 and I2.

Before the interpolation process takes place, the images I1 and I2 are compared to establish whether any image features in one of the images have moved to a new position in the other of the images. In principle, this comparison process can be carried out in either direction (that is, have any features in the later image moved to a new position in the earlier image, or vice versa). In the present example, however, the search will be carried out in a forwards time direction looking for new positions in the later image of image features found in the earlier image. This process will be referred to as motion detection.

Accordingly, the motion detection process takes place by considering individual small areas of the earlier image I1 in turn, and looking for the best image match for that small area within a wider area of the later image I2. To avoid the search being unnecessarily onerous, the search can be restricted to image positions within a predetermined offset (in the X and Y directions) with respect to the image position of the area in the image I1 under consideration.

So, in the example of FIG. 16, a test region 700 in the earlier image I1 is compared against corresponding areas within a search area 710 in the later image I2 in order to find the position 720 within the later image which most closely matches that test region 700. The displacement between the test region 700 and the position 720 can be considered as the motion of the image feature represented by the test region 700, and a so-called motion vector 730 can be constructed so as to represent that motion. For example, a motion vector might indicate the displacement, as X and Y coordinates, between the test region 700 and the position 720.

In order to derive the interpolated image $I_{int}$, the motion vector 730 is used so as to identify the positions 700, 720 in the captured images which represent the same image content as that required at a desired image position 740 in the interpolated image. In other words, a motion vector is identified which intersects the desired image position 740, and that motion vector is then used to point to sources areas 700, 720 of the two captured images. Pixel values for the desired image position 740 are then derived by interpolation between pixel values at the positions 700, 720. The process is repeated for other desired image positions within the interpolated image.

The result of this motion compensated interpolation process is that moving features of the image will generally be at the correct image position, relative to the effective temporal position of the interpolated image, within the interpolated image.

The information provided above was a brief summary of motion compensated interpolation. Further information may be obtained from sources such as EP-A-2 106 136 or EP-A-2 151 996.

Figure 17:
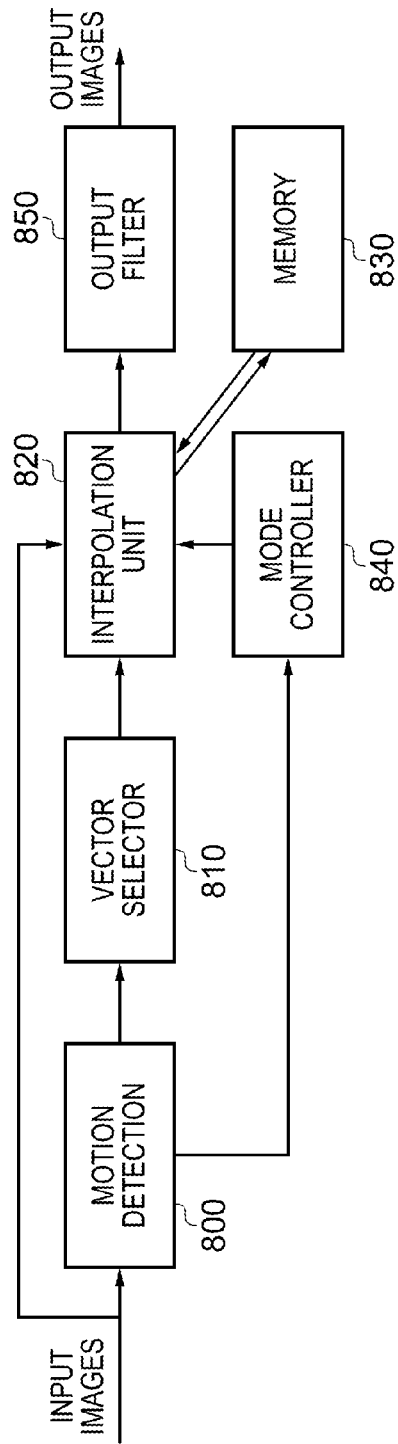
FIG. 17 schematically illustrates the operation of an interpolator.

FIG. 17 schematically illustrates the operation of an interpolator such as one of the interpolators described above.

Successive input images are supplied to a motion detection unit 800 which operates in the manner described with reference to FIG. 16 to detect motion between the successive input images. A vector selector 810 users known techniques to select the most applicable motion vector (which could be a motion vector indicative of zero motion) for each pixel or small group of pixels in the required interpolated image. An interpolation unit 820 carries out interpolation according to the selected motion vectors, temporarily storing (where necessary) image information in a memory 830.

Two optional features are illustrated in FIG. 17, one being a mode controller 840 which can act to switch the interpolation unit 820 between two different possible modes of operation, depending on whether motion is detected or motion is not detected. Another optional feature is an output filter 850 which filters the images generated by the interpolation unit to remove artefacts associated with the interpolation process.

Figure 18:
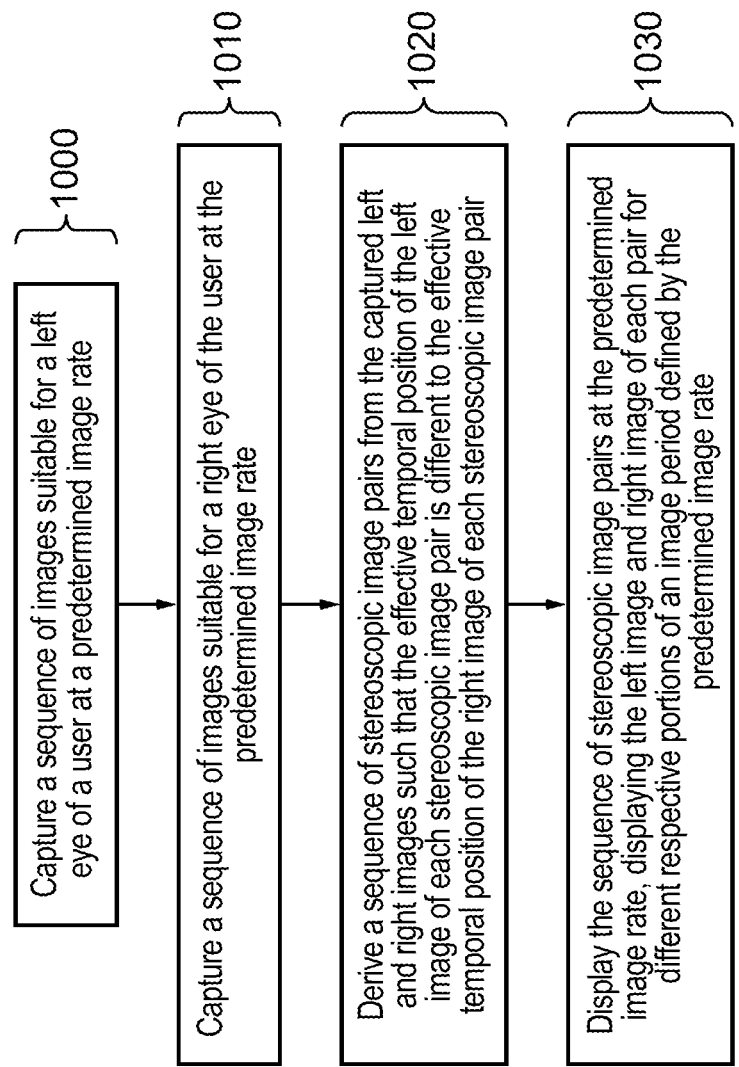
FIG. 18 schematically illustrates a method of displaying successive stereoscopic image pairs in accordance with embodiments of the invention.

FIG. 18 schematically illustrates a method of displaying successive stereoscopic image pairs in accordance with embodiments of the invention. At a step 1000, a sequence of images suitable for a left eye of a user is captured at a predetermined frame rate. At a step 1010, a corresponding sequence of images suitable for a right eye of the user is captured at the predetermined frame rate. The captured left and right image sequence may be captured, for example, by the 3D camera arrangements illustrated in FIG. 7, 8 or 13 or (in some embodiments) by a conventional 3D camera arrangement.

At a step 1020, a sequence of stereoscopic image pairs is derived from the captured left and right images. The sequence of stereoscopic image pairs is derived such that the effective temporal position of the left image of each pair is different to the effective temporal position of the right image of each pair. This difference in effective temporal position may be achieved by capturing corresponding left and right images at different times (as shown, for example, in FIG. 6) or by capturing left and right images at the same time but then processing the images to produce stereoscopic image pairs where the left image of each pair has a different effective temporal position to the right image of each pair (as shown, for example, in FIGS. 9 and 10).

At a step 1030, the derived sequence of stereoscopic image pairs is displayed at the predetermined image rate. The left image and right image of each stereoscopic image pair are displayed for different respective portions of an image period defined by the predetermined image rate (as shown, for example, in FIG. 2).

The various techniques above can be implemented in hardware, software, firmware or combinations of these. In embodiments which make use of software or firmware controlled data processing apparatus, it will be appreciated that such software or firmware, and/or media by which such software or firmware is provided (such as a non-transitory machine-readable storage medium, for example an optical disc) may be considered as embodiments of the present invention.

While embodiments described above have considered images with an effective temporal separation of half an image period between the respective left and right images of a 3D image pair for display, it will be appreciated that it is not necessary to use exactly half an image period as the spacing. At least partial advantages of the present techniques can be obtained if a different temporal spacing is used.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of displaying successive stereoscopic image pairs, the method comprising:
  capturing, at a predetermined image rate, a sequence of images suitable for a left eye of a viewer and capturing, at the predetermined image rate, a corresponding sequence of images suitable for a right eye of the viewer;
  displaying a sequence of stereoscopic image pairs at the predetermined image rate, in which each displayed stereoscopic image pair comprises one left image suitable for the left eye of the viewer and one right image suitable for the right eye of the viewer, the one left and one right images being derived from the captured sequence of images suitable for the left and right eye of the viewer, respectively; in which:
    the one left image and the one right image of each stereoscopic image pair are displayed for different respective portions of an image period defined by the predetermined image rate;
    an effective temporal position of the one left image of a stereoscopic image pair for display is different from an effective temporal position of the one right image of that stereoscopic image pair;
    each image of the captured sequence of images suitable for the left eye of the viewer is captured at the same instant as a corresponding image of the captured sequence of images suitable for the right eye of the viewer; and processing at least one of the captured sequences of images so that, for each stereoscopic image pair from the sequence of stereoscopic image pairs, the effective temporal position of the one left image of that stereoscopic image pair is different to the effective temporal position of the one right image, the processing step comprising interpolating one of the left image and the right image of each stereoscopic image pair from two or more of the captured sequence of images suitable for the left and right eye of the viewer, respectively, the interpolated left and/or right image having a different effective temporal position to the captured images from which that interpolated image is derived, and applying a delay to the other of the left image and the right image of each stereoscopic image pair.

2. A method according to claim 1, in which:
a given stereoscopic image pair is derived from a pair of the captured images suitable for the left and right eye of the viewer respectively; and
the image from the captured sequence of images suitable for the left eye of the viewer is captured at a different time to the corresponding image from the captured sequence of images suitable for the right eye of the viewer.

3. A method according to claim 1, in which the interpolating step comprises applying motion-compensated interpolation.

4. A method according to claim 1, in which the displaying step comprises alternately displaying the one left image and one right image of each stereoscopic image pair for respective non-overlapping single portions of each image period.

5. A method according to claim 4, in which the respective portions of the image period are equal in length.

6. A method according to claim 5, in which the start of a portion of the image period in which the left image of a stereoscopic image pair is displayed is temporally displaced from the start of a portion of the image period in which the right image of that stereoscopic image pair is displayed by a displacement substantially equal to half of an image period.

7. A method according to claim 1, in which the effective temporal position of the one left image of a stereoscopic image pair for display is different from the effective temporal position of the one right image of that stereoscopic image pair by a difference substantially equal to half of an image period.

8. A method according to claim 1, in which the capturing step comprises capturing the sequence of images suitable for a left eye of a viewer and the corresponding sequence of images suitable for a right eye of the viewer using different respective left and right cameras laterally displaced from one another.

9. A non-transitory machine-readable storage medium having computer software stored therein, the software, when executed by a computer, causes the computer to carry out the method according to claim 1.

10. Apparatus for displaying successive stereoscopic image pairs captured as a sequence of images suitable for a left eye of a viewer at a predetermined image rate and a corresponding sequence of images suitable for a right eye of the viewer at the predetermined image rate, the apparatus comprising:
a display configured to display a sequence of stereoscopic image pairs at the predetermined image rate, in which each displayed stereoscopic image pair comprises one left image suitable for the left eye of the viewer and one right image suitable for the right eye of the viewer, the one left and one right images being derived from the captured sequence of images suitable for the left and right eye of the viewer, respectively;
in which the one left image and the one right image of each stereoscopic image pair are displayed for different respective portions of an image period defined by the predetermined image rate; and
a processor configured to process the captured images so that an effective temporal position of the one left image of a stereoscopic image pair for display is different from an effective temporal position of the one right image of that stereoscopic image pair;
in which:
each image of the captured sequence of images suitable for the left eye of the viewer is captured at the same instant as a corresponding image of the captured sequence of images suitable for the right eye of the viewer; and
the processor is configured to process at least one of the captured sequences of images so that, for each stereoscopic image pair from the sequence of stereoscopic image pairs, the effective temporal position of the one left image of that stereoscopic image pair is different from the effective temporal position of the one right image, the processor interpolating one of the left image and the right image of each stereoscopic image pair from two or more of the captured sequence of images suitable for the left and right eye of the viewer, respectively, the interpolated left and/or right image having a different effective temporal position from the captured images from which that interpolated image is derived, and applying a delay to the other of the left image and the right image of each stereoscopic image pair.

* * * * *